May 17, 1932.  E. R. WOLFERT  1,858,845
VOLTAGE COMPENSATOR
Filed Oct. 28, 1929    3 Sheets-Sheet 2

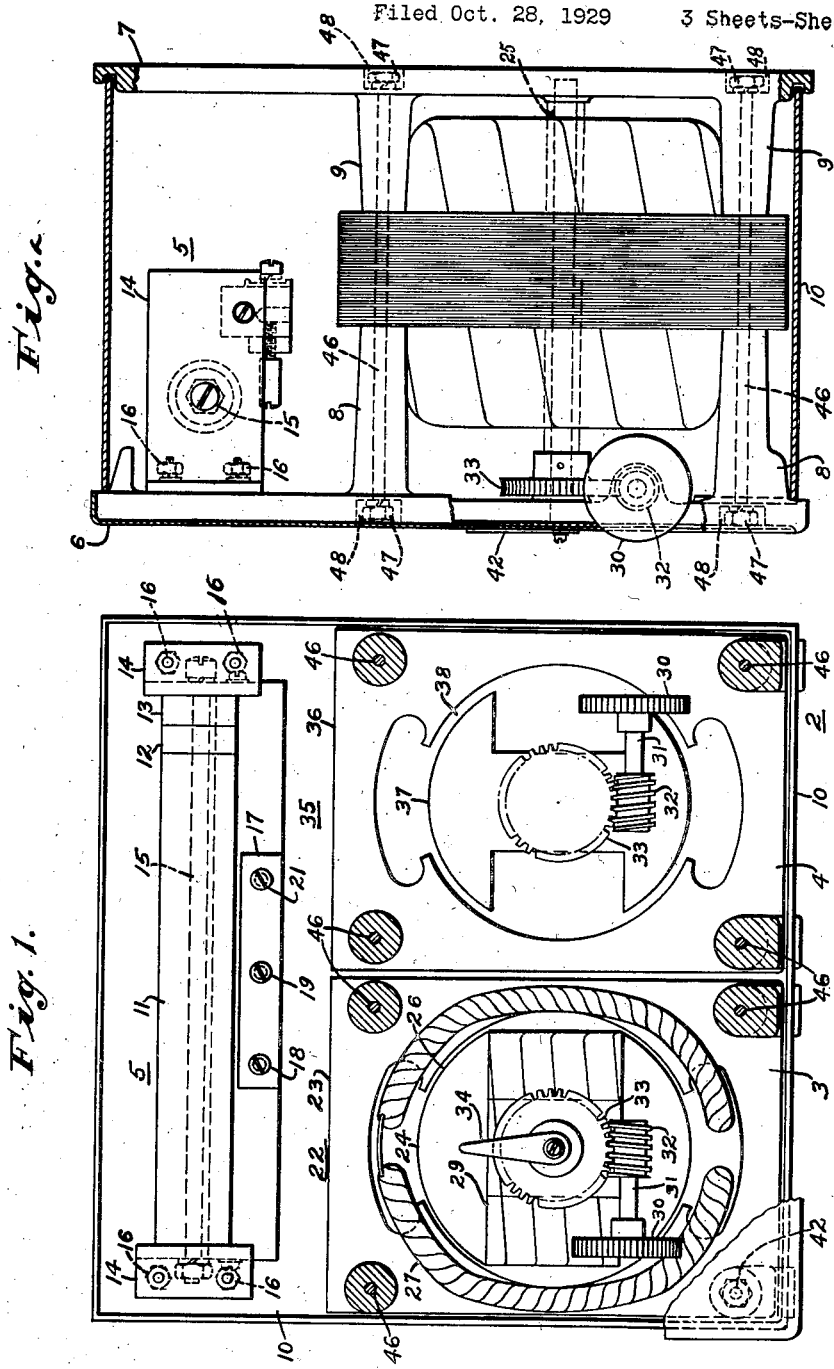

INVENTOR
Edward R. Wolfert
BY
ATTORNEY

May 17, 1932.  E. R. WOLFERT  1,858,845
VOLTAGE COMPENSATOR
Filed Oct. 28, 1929   3 Sheets-Sheet 3

INVENTOR
*Edward R. Wolfert*
BY
ATTORNEY

Patented May 17, 1932

1,858,845

UNITED STATES PATENT OFFICE

EDWARD R. WOLFERT, OF WILKINSBURG, PENNSYLVANIA, ASSIGNOR TO WESTINGHOUSE ELECTRIC & MANUFACTURING COMPANY, A CORPORATION OF PENNSYLVANIA

VOLTAGE COMPENSATOR

Application filed October 28, 1929. Serial No. 403,086.

My invention relates to compensation and it has special relation to voltage compensators.

It is frequently desirable to energize an electro-responsive device, such as a voltmeter or regulator, in accordance with the voltage at a point in an electrical circuit remote from that to which it is connected. It is then necessary to compensate the energization of the device in accordance with the voltage drop in the line caused by the resistance and reactance of the circuit.

This compensation may be obtained by introducing, into the energizing circuit of the electro-responsive device, a voltage component that is proportional to the ohmic voltage drop in the circuit and a voltage component that is proportional to the reactive voltage drop in the circuit. These voltage components may be obtained by introducing, into the energizing circuit of the electro-responsive device, a resistor and a reactor having a current flowing therethrough that is proportional to the current in the circuit. The resistor and reactor have resistance and reactance values that bear the same ratio to the resistance and reactance of the circuit as the ratio of the current flowing through them bears to the current in the circuit. In other words, the electrical characteristics of the circuit itself are reproduced in the energizing circuit of electro-responsive device but in a much smaller degree.

The electro-responsive device will then be responsive to a voltage that is the vector sum of a voltage component that is proportional to the voltage of the feeder, a voltage component that is proportional to the ohmic voltage drop in the circuit and a voltage component that is proportional to the reactive voltage drop in the circuit. These voltage components will automatically increase as the load on the circuit increases and decrease with a reduction in the load, thereby automatically compensating for the voltage drop in the circuit for all loads.

Compensators of the above described type have been employed wherein a current transformer has been utilized in conjunction with a multi-tapped resistor and a multi-tapped reactor to compensate for the ohmic and reactive drops, respectively, in the feeder. By varying the tap connections, a large range of resistance and reactance values may be obtained.

The disadvantages of this type of compensator are the multiplicity of contacts, the possibility of the opening of the current-transformer secondary and that the variations in the values of the resistance and the reactance are made in definite steps.

One object of my invention is to provide a compensator of the above indicated character that shall be compact, efficient, reliable in operation and easily manufactured.

Another object of my invention is to provide a compensator of the above indicated character that shall compensate a voltage-responsive means for the voltage drop in an electric circuit and that shall provide for adjusting the degree of compensation in accordance with the resistance and the reactance of the circuit.

A further object of my invention is to provide a compensator of the above indicated character in which the variations in compensation are closer than has heretofore been obtainable.

A still further object of my invention is to provide a compensator of the above indicated character in which the variations in compensation are obtained without employing tap connections.

To achieve the objects of my invention, I propose to utilize the principle of magnetic induction to secure the variations in compensation. I provide two variable-inductance devices, each comprising a magnetic core consisting of two members, one of which is capable of rotative movement within the other, and a winding disposed on each member of the core. The members of one core are separated by a very narrow air gap while the members of the other core are separated by a relatively wide air gap. All the windings are connected in series-circuit relation and are energized by a current that is proportional to the current flowing in the circuit. I provide also a third winding on each core, inductively related to the other windings thereon and a resistor in parallel-circuit relation to the third winding on the core having the narrow air gap. I connect the resistor and the third winding on the core having the wide air gap in series-circuit relation to the electro-responsive device.

If a current is caused to flow through two series-connected windings disposed on one magnetic core, each winding having the same number of turns and their magnetic axes coinciding, in one position of coincidence, the magnetizing effects of the two windings are opposed to each other and neutralize each other in magnetizing the core. In this case, the resultant self inductance and the voltage induced across the windings is substantially zero.

If the windings are so positioned that their magnetic axes are in coincidence in the opposite direction, so that the magnetizing effect of one winding cooperates with the other winding in magnetizing the core, the maximum self inductance is produced, and the induced voltage across the windings is a maximum. For varying positions of the windings between the positions of coincidence of their magnetic axes, the induced voltage across the windings will vary from zero to a maximum.

By placing a third winding on the core, in inductive relation to the two series windings and having a greater number of turns, the voltage ratio between the third winding and the series-connected windings will be proportional to the ratio of the number of effective turns of the series-connected windings and the third winding.

With a very narrow air gap between the movable and stationary members of the core, the electrical characteristics of the variable inductance device are similar to those of a current transformer having variable primary and secondary turns. Relatively little magnetizing current will be required, and the induced voltage across the series-connected windings will be substantially in phase with the energizing current. If the third winding on the core is closed through the resistor, a current will be induced therein that will be displaced substantially one hundred and eighty electrical degrees from the energizing current, and the voltage drop across the resistor will be in phase with the current in the third winding.

If the air gap separating the core members is relatively large, the air-gap reluctance will be correspondingly large, necessitating a large magnetizing current, and the induced voltage across the series-connected windings will be displaced substantially ninety electrical degrees from the energizing current. The induced voltage across the third winding will then be displaced substantially one hundred and eighty electrical degrees from the voltage across the series-connected windings.

My invention may be better understood by referring to the following detailed description and to the accompanying drawings, in which, Figure 1 is a view, in front elevation, of a compensator constructed in accordance with my invention, a portion of the framework and the windings of one variable inductance device being removed;

Fig. 2 is a side elevational view of the embodiment of my invention illustrated in Fig. 1.

Figure 3:
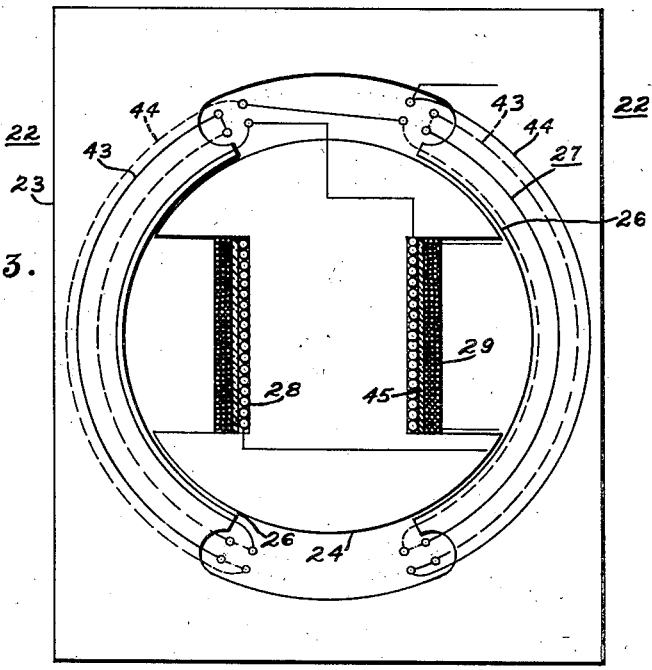
Fig. 3 is a diagramatic view showing the arrangement of the core and windings.

Referring to Figs. 1, 2 and 3 of the drawings, my compensator comprises, in general a framework 2, having two variable-induction devices 3 and 4 and a resistor 5 disposed therein.

The framework 2 consists of a front-wall member 6 and a rear-wall member 7, both members 6 and 7 having lateral projections 8 and 9, respectively, extending inwardly therefrom. A screen 10 is disposed around the framework 2 to protect the interior of the compensator.

The resistor 5 is divided into three sections 11, 12 and 13 and is secured, at the ends thereof, to brackets 14 by a rod 15 extending longitudinally therethrough. The brackets 14 are secured to the front-wall member 6 by bolts 16 and extend inwardly therefrom, holding the resistor 5 in the proper spaced relation to the framework 2. A terminal block 17 is provided having studs 18, 19 and 21 to which the ends of the sections 11, 12 and 13 are respectively connected. The sections 12 and 13 of the resistor 5 are relatively small and are provided to permit application of the compensator to regulator systems having potential transformers of different ratios.

The variable-induction device 3, employed to compensate for the ohmic voltage drop, comprises a laminated magnetizable core 22, of substantially rectangular shape, consisting of a stator 23 and a movable member 24, rotatably mounted within the stator 23 on a shaft 25 that is supported, at each end, by the wall members 6 and 7. The stator 23 and the movable member 24 are separated by a relatively small air gap 26. Windings 27 and 28, each comprising the same number of turns as the other, are wound on the stator 23 and the movable member 24, respectively, and are connected in series-circuit relation.

A third winding 29 is provided on the movable member 24 in inductive relation to the windings 27 and 28, and is connected in parallel-circuit relation to the resistor 5. The winding 29 comprises more turns than windings 27 and 28 in order to increase the induced voltage across the winding 29 over the induced voltage across the windings 27 and 28. To the end that the movable member 24 may be rotated, with respect to the stator 23, I provide a knurled knob 30 mounted on a shaft 31 that turns a worm gear 32, which engages a gear wheel 33 mounted on the shaft 25. An indicating arm 34 is mounted at the end of the shaft 25 and is utilized to indicate on a scale (not shown) the different values of resistance for which the compensator is designed.

The variable-inductance device 4 employed to compensate for the reactive voltage drop comprises a laminated core 35 consisting of a stator 36 and an interiorly rotatable member 37, similar to the variable-inductance device 3. The stator 36 and the movable member 37 are separated by an air gap 38 that is considerably wider than the air gap 26.

Windings 39 and 40, each having the same number of turns, are disposed on the stator 36 and the movable member 37, respectively, and are connected in series-circuit relation to windings 27 and 28 of the variable-inductance device 3. A winding 41 is disposed on the movable member 37 having a greater number of turns than windings 39 and 40 and is connected in series-circuit relation to the winding 29. An indicating arm 42 indicates the different values of reactance for which the compensator is designed.

Referring to Fig. 3 of the drawings, the winding 27 is divided into two sections, connected in series-circuit relation and disposed about the stator 23. Portions of the punchings of the stator 23 are cut away at the top and at the bottom to permit the winding to extend from the front to the rear of the stator 23. The heavy lines 43 represent the parts of turns of the winding 27 on the front of the stator 23, and the dotted lines 44 represent the parts of the turns of the winding on the rear of the stator 23. A wide slot is made in both sides of the movable member 24 in which the windings 28 and 29 are disposed. The winding 28 is wound on the inside and is shown connected in series-circuit relation to the winding 27, and the winding 29 is wound over the winding 28 but separated therefrom by insulation 45. Only a few turns of each winding are illustrated. The windings on the variable-inductance device 4 are similarly arranged. While I have illustrated a preferred arrangement of the windings and shape of the punchings for the stator 23 and the movable member 24, it is to be understood that other forms may be employed.

The variable-inductance devices 3 and 4 are disposed adjacently on the framework 2, the stator members 23 and 36 extending between, and engaging, the lateral projections 8 and 9. Rods 46, threaded at both ends, extend through each of the lateral projections 8 and 9 and the four corners of the stator members 23 and 36. Each rod 46 is provided with nuts 47 at its ends which fit into recesses 48 in the wall members 6 and 7, that may be turned to rigidly clamp the wall members and the stator members 23 and 36 together, thereby forming a compact structure.

My compensator has particular application to an induction regulator and I have elected to illustrate it in application thereto but it will be obvious that it has application wherever compensation for line drop is desired, for example, remote metering and control.

Figure 4:
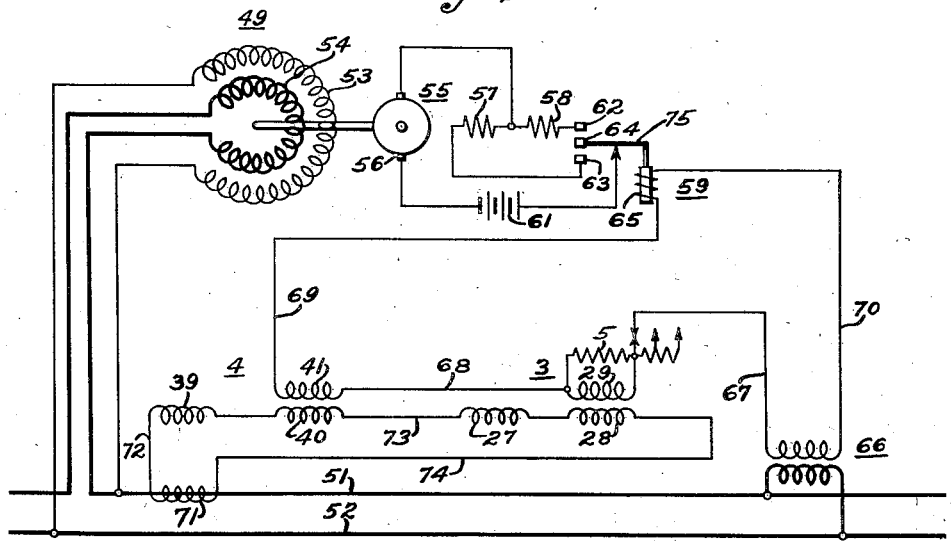
Fig. 4 is a diagrammatic view of apparatus and circuits employed in the application of one embodiment of my invention to an induction regulator.

Referring to Fig. 4 of the drawings, an induction regulator 49 is provided for regulating the voltage at the center of distribution of a circuit comprising conductors 51 and 52. A primary winding 53 of the regulator is connected in parallel-circuit relation, and a secondary winding 54 is connected in series-circuit relation, to the conductors 51 and 52 of the circuit to be regulated. For the purpose of changing the relative positions of the primary and secondary windings of the induction regulator, an electric motor 55 is provided. The motor 55 comprises an armature winding 56 and differentially related series field windings 57 and 58. A relay or contact-making voltmeter 59 is provided for effecting the operation of the motor 55 by connecting it to a source of electric energy, such as a battery 61, to thereby control the regulator 49.

The contact-making voltmeter 59 comprises fixed contact members 62 and 63 and a movable contact member 64 that is adapted to engage the fixed contact members 62 and 63 and is actuated by an operating winding 65. The motor 55 is caused to rotate in the one or the other direction upon the operation of the relay 59 to complete a circuit from one side of battery 61, through the armature winding 56, one of the differentially related field windings 57 and 58, one of the two fixed contact members 62 or 63 and the movable contact member 64, to the other side of battery 61.

The operating winding 65 of the contact-making voltmeter 59 is connected to a voltage transformer 66 that is energized in accordance with the voltage across conductors 51 and 52.

A compensating device, similar to that hereinbefore described, is connected between the voltage transformer 66 and the winding 65 to provide for introducing into the circuit of the contact-making voltmeter 59 a voltage component that will compensate for the ohmic voltage drop in the line and a voltage component that will compensate for the reactive voltage drop in the line. The circuit of the operating winding 65 may be traced from the secondary winding of the voltage transformer 66, through conductor 67, resistor 5, conductor 68, winding 41 on the variable-inductance device 4, conductor 69, the operating winding 65 and conductor 70, to the secondary of the voltage transformer 66. A current transformer 71 is provided for energizing the compensator with a current proportional to the line current. The compensator-energizing circuit may be traced from the secondary winding of the current transformer 71, through conductor 72, windings 39 and 40 of the variable inductance device 4, conductor 73, windings 27 and 28, of the variable-inductance device 3 and conductor 74, to the secondary of the current transformer.

The operation of the regulator system employing my compensator, illustrated in Fig. 4, is as follows:

The movable members 24 and 37 of the variable-inductance devices 3 and 4 are adjusted until the voltage drop across the resistor 5 bears a predetermined ratio to the ohmic voltage drop in the circuit, and the voltage drop across the variable-inductance device 4 bears a predetermined ratio to the reactive voltage drop in the circuit for a predetermined load on the circuit. At these settings of the movable members 24 and 37, the variable-inductance devices 3 and 4 will introduce voltage components into the circuit of the operating winding 65 that will increase for an increase in load and decrease for a decrease in load on the circuit, becoming zero at no load.

When there is no load on the circuit, the full voltage of the transformer 66 is impressed on the winding 65 of the contact-making voltmeter 59, and the regulator is actuated in the one or the other direction to maintain a constant and predetermined voltage across the relay. At this voltage, the balance arm 75 of the contact-making voltmeter is in a balanced position.

When there is load on the feeder, and current flows in the line, the voltage drops across the variable-inductance device 4 and the resistor 5 ar subtracted vectorially from the voltage of the potential transformer 66, and, as the contact-making voltmeter 59 requires a constant voltage to maintain it in a balanced position, it will cause the regulator to increase the voltage of the feeder until the difference in the voltage between the potential-transformer voltage and the voltage drops across the variable-inductance device 4 and the resistor 5 is the same as before, and the balance arm 75 of the relay 59 assumes a neutral position.

Under these conditions, the voltage across the potential transformer 66 will be higher than before, but, at the center of distribution, the voltage will be substantially unaffected.

If the load decreases, the voltage drop across the compensator will decrease, the voltage impressed upon the winding 65 will be more than sufficient to maintain the balance arm 75 in a neutral position and the regulator will be actuated to decrease the voltage until the balance arm is again in a neutral position.

Figure 5:
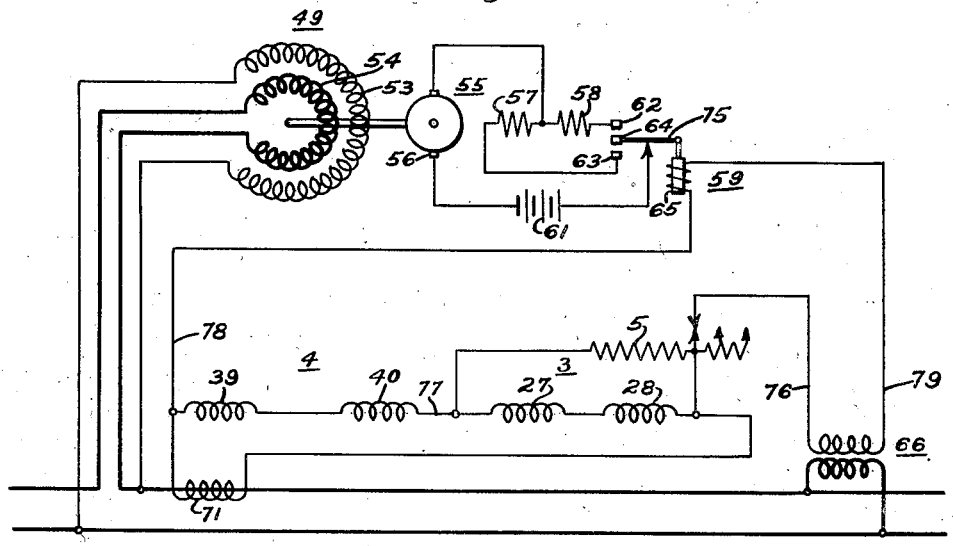
Fig. 5 is a diagrammatic view of apparatus and circuits employed in the application of another embodiment of my invention to an induction regulator.

Referring to Fig. 5, the embodiment of my invention applied to a regulating system is similar to the one hereinbefore described except that the windings 29 and 40 on the movable members 23 and 37 of the variable-inductance devices 3 and 4 are omitted. The resistor 5 is connected in parallel-circuit relation to the windings 27 and 28 of the variable-inductance device 3. The windings 39 and 40 and the resistor 5 are connected in series-circuit relation to the operating winding 65 of the relay 59. The circuit of the operating winding 65 may be traced from the secondary winding of the potential transformer 66, through conductor 76, resistor 5, conductor 77, windings 40 and 39, conductor 78, winding 65 and, by conductor 79, to the potential transformer.

The operation of this system is similar to that illustrated in Fig. 4. To secure the same voltage drop across the variable-inductance devices, a larger current has to pass through the windings, because the voltages induced across the windings 27 and 28 and 39 and 40 are not stepped up to the desired values, and the required voltages must be produced by these windings. This larger current makes the losses in this system larger and, therefore, less desirable than the system illustrated in Fig. 4.

If the power factor of the circuit is unity, there will be substantially no reactive drop, and the variable inductance device 4 may be omitted.

Since various changes and modifications may be made in the arrangement and assembly of the several features of my invention without departing from the spirit and scope thereof, it is to be understood that no limitations are to be imposed except those expressed in the appended claims.

I claim as my invention:

1. A compensator for compensating for the voltage drop in an electric circuit comprising a core having a substantially closed magnetic circuit, a portion of the core being adapted to move relatively to the other portion, series-connected windings disposed on the stationary and the movable portions of the core member, a resistor connected in parallel-circuit relation to said windings, and means for so varying the relative positions of the portions of the core that the magnetizing effect of the windings may buck or boost each other to produce variable-voltage drops across said resistor, when energized.

2. A device for compensating for the voltage drop in an electric circuit comprising series-connected windings disposed on a core having a substantially closed magnetic circuit, a portion of the core carrying one winding being adapted to move relatively to the remainder of the core, a second winding disposed on the movable portion of the core in inductive relation to the series windings, a resistor connected in parallel-circuit relation to the second winding, means for so varying the relative positions of the series-connected windings that their magnetizing effects buck or boost each other, when energized, to produce variable voltage drops across said resistor.

3. A device for compensating for the ohmic and reactive voltage drops in an electric circuit comprising two core members, one having a substantially negligible air gap in its magnetic circuit and the other having an appreciable air gap therein, each core member consisting of two relatively movable portions and having one of a plurality of series-connected windings disposed on each portion, a resistor connected in parallel-circuit relation to the windings associated with the closed magnetic circuit and means for so shifting the movable portion of each core member that the magnetic fields produced when the windings are energized are cumulative or subtractive to produce variable ohmic drops across the resistor and variable reactive drops across the windings associated with the core member having an air gap.

4. A device for compensating for the ohmic and reactive voltage drops in an electric circuit comprising two core members, each core member consisting of two relatively movable portions and having a winding disposed on each portion, said windings being connected in series-circuit relation, a third winding disposed on each of said core members and inductively related to the other windings on the core, one of said core members having a substantially negligible air gap in the magnetic circuit and the other core member having an appreciable air gap therein between the relatively movable portions, a resistor connected in parallel-circuit relation with the third winding on the core member having the air gap therein, means for so changing the relative positions of the magnetic axes of the windings associated with each core member that the magnetic fields produced by said windings will buck or boost each other when the windings are energized to produce variable ohmic voltage drops across the resistor and variable reactive voltage drops across the windings associated with the core member having the air gap.

5. A device for compensating for the voltage drop in an electric circuit comprising a reactor and a resistor, said reactor comprising a magnetic core having two portions relatively movable and separated by a relatively wide air gap, each portion of the core having a winding disposed thereon, said windings being connected in circuit relation, means for so varying the angle between the magnetic axes of the windings that the magnetizing effect of the two windings aid and oppose each other, when energized, to produce variable reactive voltage drops across the windings, means for varying the effect of said resistor comprising a magnetic core having two portions relatively movable and separated by a substantially negligible air gap, a winding disposed on each portion of the core, said windings being connected in circuit relation, said resistor being connected in parallel-circuit relation to said windings, means for so varying the angle between the magnetic axes of the windings that the magnetizing effect of the windings oppose and aid each other, when energized, to produce variable ohmic voltage drops across said resistor.

6. A device for compensating for the voltage drop in an electric circuit comprising a reactor and a resistor, said reactor comprising a magnetic core having relatively movable portions separated by a relatively wide air gap, each portion of the core having a winding disposed thereon, said windings being connected in circuit relation, an auxiliary winding disposed on the core member and inductively related to the other windings, means for so varying the angle between the magnetic axes of the series-connected windings that the magnetizing effect of the two windings aid and oppose each other, when energized, to produce variable reactive voltage drops across the auxiliary winding, means for varying the effect of said resistor comprising a magnetic core having two portions relatively movable and having a negligible air gap in its magnetic circuit, a winding disposed on each portion of the core, said windings being connected in series-circuit relation, an auxiliary winding disposed on the core and inductively related to the series windings, said resistor being connected in parallel-circuit relation to said auxiliary winding, means for so varying the relative positions of the magnetic axes of the series-connected windings that the magnetizing effect of the windings buck and boost each other, when energized, to produce variable ohmic voltage drops across said resistor.

7. In combination, a main electric circuit, an electro-responsive means, an auxiliary circuit for connecting said electro-responsive means to be energized in accordance with the voltage of said main electric circuit, compensating means for introducing into said auxiliary circuit a voltage proportional to the voltage drop in said main electric circuit comprising a core having a negligible air gap in its magnetic circuit and a core having an appreciable air gap, two pairs of windings, one pair being inductively related to each core, and means for varying the angle of the magnetic axes of each pair of windings, said several windings being energized in accordance with the current flowing in the main electric circuit.

8. In combination, an electric circuit, a compensator for producing a voltage proportional to the voltage drop in said circuit comprising a core structure having a negligible air gap in its magnetic circuit, a pair of series-connected windings in inductive relation thereto and energized in accordance with the current flowing in said electric circuit, and means for varying the angle of the magnetic axes of said windings, a second core structure having a magnetic circuit including an appreciable air gap, a pair of series-connected windings in inductive relation thereto and energized in accordance with the current flowing in said electric circuit, and means for varying the angle of the magnetic axes of said windings.

9. In combination, an electric circuit, an electro-responsive means energized in accordance with the voltage of said circuit, and means for compensating said electro-responsive means in accordance with the voltage drop in said circuit comprising a reactor and a resistor operatively connected thereto, said reactor comprising a magnetic core and two windings inductively related thereto and energized in accordance with the current flowing in said circuit, means for varying the mutual inductance of said windings and means for varying the voltage drop across said resistor comprising a magnetic core and two windings inductively related thereto and energized in accordance with the current flowing in said circuit, and means for varying the mutual inductance of said windings.

10. In combination, an electric circuit, an electro-responsive means energized in accordance with the voltage of said circuit, means for compensating the energization of said electro-responsive means in accordance with the voltage drop in said circuit comprising a pair of windings energized in accordance with the current flowing in said circuit, means for varying the mutual inductance of said windings for varying the energization of said electro-responsive means in accordance with the reactive voltage drop in said circuit, a resistor connected in circuit with said electro-responsive means, means for varying the voltage across said resistor in accordance with the ohmic voltage drop in said circuit comprising a pair of windings energized in accordance with the current flowing in said circuit, and means for varying the mutual inductance of said windings.

11. In combination, an electric circuit, an electro-responsive means energized in accordance with the voltage of said circuit, means for compensating the energization of said electro-responsive means in accordance with the voltage drop in said circuit comprising a pair of windings energized in accordance with the current flowing in said circuit, said windings being relatively movable for adjusting the mutual inductance therebetween.

12. In combination, an electric circuit, an electro-responsive means energized in accordance with the voltage of said circuit, means for compensating the energization of said electro-responsive means in accordance with the voltage drop in said circuit comprising a core structure and a pair of series-connected windings in inductive relation thereto and energized in accordance with the current flowing in said electric circuit, and means for varying the angle of the magnetic axes of said windings.

13. In an electric circuit having a motor-operated regulator associated therewith for varying an electrical quantity thereof, control means for the motor energized in accordance with the voltage of said circuit, means for compensating for the ohmic voltage drop in the circuit comprising a magnetic core and two series-connected windings inductively related thereto and energized according to the current flowing in the circuit, a third winding disposed on said core in inductive relation to the first named windings, a resistor connected in circuit relation to said third winding, means for varying the angle between the magnetic axes of the series-connected windings to produce variable drops across said resistor, said resistor being connected in circuit with the motor-control means.

14. In an electric circuit having a motor-operated regulator associated therewith for varying an electrical quantity thereof and electro-responsive means for controlling the operation of the regulator means in accordance with the voltage of said circuit, means for compensating for the voltage drop in the circuit including a current transformer energized from said circuit, two inductively related windings disposed for relative movement and connected in circuit relation with the current transformer, a resistor connected in parallel-circuit relation with said windings, means for altering the relative positions of said windings so that the voltage drop across the resistor has a definite relation to the voltage drop in the circuit, the resistor being connected in circuit relation to said regulator-control means.

15. In an electric circuit having motor-operated regulator means associated therewith for varying an electrical quantity thereof and electro-responsive means energized in accordance with the voltage of the circuit for controlling the operation of the regulator means, means for compensating for the ohmic and the reactive voltage drops in said circuit comprising two series-connected inductively related windings loosely coupled on a magnetizable core and disposed for relative movement, two series-connected inductively related windings closely coupled on a magnetizable core and disposed for relative movement, a resistor connected in parallel-circuit relation to the closely coupled windings, the four windings being connected in series-circuit relation and energized in accordance with the current flowing in said circuit, means for so altering the relative positions of the windings that the voltage drop across the loosely coupled windings is in a predetermined ratio to the reactive voltage drop in the circuit, and the voltage drop across the resistor is in a predetermined ratio to the ohmic voltage drop in the circuit, the resistor and the loosely coupled windings being connected in circuit relation with the electro-responsive means.

16. In an electric circuit, regulator means connected thereto for varying the voltage thereof and regulator-controlling means actuated in accordance with the voltage of said circuit, means for compensating for the reactive and the ohmic voltage drops in the circuit comprising two series-connected inductively related windings loosely coupled on a magnetizable core and disposed for relative movement, an auxiliary winding disposed on said core member and inductively related to said series windings, two series-connected inductively related windings closely coupled on a second magnetizable core and disposed for relative movement, a second auxiliary winding disposed on the second core member and inductively related to the closely coupled windings, a resistor connected in parallel-circuit relation to the second auxiliary winding, means for so varying the relative positions of the windings that the voltage drop across the first auxiliary winding is in a predetermined ratio to the reactive voltage drop in the line and the voltage drop across the resistor is in a predetermined ratio to the ohmic voltage drop in the line, the resistor and the first auxiliary winding being connected in circuit with the regulator-controlling means.

In testimony whereof, I have hereunto subscribed my name this 21st day of October, 1929.

EDWARD R. WOLFERT.